(12) United States Patent
Iftime et al.

(10) Patent No.: US 8,147,714 B2
(45) Date of Patent: *Apr. 3, 2012

(54) FLUORESCENT ORGANIC NANOPARTICLES AND A PROCESS FOR PRODUCING FLUORESCENT ORGANIC NANOPARTICLES

(75) Inventors: Gabriel Iftime, Mississauga (CA); Daryl W. Vanbesien, Burlington (CA); Jordan H. Wosnick, Toronto (CA); Shigang S. Qiu, Etobicoke (CA); Kelly Zhou, Mississauga (CA); Valerie M. Farrugia, Oakville (CA)

(73) Assignee: Xerox Corporation, Norwalk, CT (US)

( * ) Notice: Subject to any disclaimer, the term of this patent is extended or adjusted under 35 U.S.C. 154(b) by 730 days.

This patent is subject to a terminal disclaimer.

(21) Appl. No.: 12/246,175

(22) Filed: Oct. 6, 2008

(65) Prior Publication Data

US 2010/0084610 A1    Apr. 8, 2010

(51) Int. Cl.
*C09K 11/02* (2006.01)
*C09D 11/00* (2006.01)

(52) U.S. Cl. ............ 252/301.35; 252/301.36; 106/31.27

(58) Field of Classification Search .......... 252/301.35, 252/301.36, 301.16; 523/160, 161, 200, 523/205; 428/402, 690, 302; 106/31.27, 106/31.33, 31.64, 31.32, 31.15, 31.14
See application file for complete search history.

(56) References Cited

U.S. PATENT DOCUMENTS

| | | | |
|---|---|---|---|
| 2,809,954 A | 10/1957 | Kazenas | |
| 2,938,873 A | 5/1960 | Kazenas | |
| 3,455,856 A | 7/1969 | Voedisch et al. | |
| 3,590,000 A | 6/1971 | Palermiti et al. | |
| 3,642,650 A | 2/1972 | McIntosh | |
| 3,800,588 A | 4/1974 | Larson et al. | |
| 3,847,604 A | 11/1974 | Hagenbach et al. | |
| 3,944,493 A | 3/1976 | Jadwin et al. | |
| 4,007,293 A | 2/1977 | Mincer et al. | |
| 4,079,014 A | 3/1978 | Burness et al. | |
| 4,291,111 A | 9/1981 | Lu | |
| 4,338,390 A | 7/1982 | Lu | |
| 4,394,430 A | 7/1983 | Jadwin et al. | |
| 4,560,635 A | 12/1985 | Hoffend et al. | |
| 4,714,682 A | 12/1987 | Schwartz | |
| 4,830,671 A | 5/1989 | Frihart et al. | |
| 4,889,560 A | 12/1989 | Jaeger et al. | |
| 4,889,761 A | 12/1989 | Titterington et al. | |
| 4,935,326 A | 6/1990 | Creatura et al. | |
| 4,937,166 A | 6/1990 | Creatura et al. | |
| 4,975,220 A | 12/1990 | Streitel et al. | |

(Continued)

FOREIGN PATENT DOCUMENTS

EP    0 463 260 A1    1/1992

(Continued)

OTHER PUBLICATIONS

May 28, 2009 Office Action issued in U.S. Appl. No. 12/245,824.

(Continued)

*Primary Examiner* — Jerry Lorengo
*Assistant Examiner* — Lynne Edmondson
(74) *Attorney, Agent, or Firm* — Oliff & Berridge, PLC (57) ABSTRACT

Fluorescent organic nanoparticles and a process for producing fluorescent organic nanoparticles having a size of less than about 500 nanometers comprising a polymeric matrix comprising one or more crosslinked polymer resins, and comprising one or more fluorescent dyes incorporated into the polymer matrix.

14 Claims, 1 Drawing Sheet

U.S. PATENT DOCUMENTS

| | | | |
|---|---|---|---|
| 5,073,498 A | 12/1991 | Schwartz et al. | |
| 5,093,147 A | 3/1992 | Andrus et al. | |
| 5,094,777 A | 3/1992 | DiPietro | |
| 5,194,638 A | 3/1993 | Frihart et al. | |
| 5,221,335 A | 6/1993 | Williams et al. | |
| 5,264,153 A | 11/1993 | De Krom | |
| 5,278,020 A | 1/1994 | Grushkin et al. | |
| 5,290,664 A | 3/1994 | Matsumoto | |
| 5,294,664 A | 3/1994 | Morrison, Jr. et al. | |
| 5,308,734 A | 5/1994 | Sacripante et al. | |
| 5,344,738 A | 9/1994 | Kmiecik-Lawrynowicz et al. | |
| 5,346,797 A | 9/1994 | Kmiecik-Lawrynowicz et al. | |
| 5,348,832 A | 9/1994 | Sacripante et al. | |
| 5,364,729 A | 11/1994 | Kmiecik-Lawrynowicz et al. | |
| 5,366,841 A | 11/1994 | Patel et al. | |
| 5,370,963 A | 12/1994 | Patel et al. | |
| 5,372,852 A | 12/1994 | Titterington et al. | |
| 5,403,693 A | 4/1995 | Patel et al. | |
| 5,405,728 A | 4/1995 | Hopper et al. | |
| 5,418,108 A | 5/1995 | Kmiecik-Lawrynowicz et al. | |
| 5,435,937 A | 7/1995 | Bell et al. | |
| 5,439,971 A | 8/1995 | Hyche | |
| 5,496,676 A | 3/1996 | Croucher et al. | |
| 5,501,935 A | 3/1996 | Patel et al. | |
| 5,527,658 A | 6/1996 | Hopper et al. | |
| 5,529,876 A | 6/1996 | Sasaki et al. | |
| 5,554,480 A | 9/1996 | Patel et al. | |
| 5,585,215 A | 12/1996 | Ong et al. | |
| 5,593,807 A | 1/1997 | Sacripante et al. | |
| 5,597,856 A | 1/1997 | Yu et al. | |
| 5,621,022 A | 4/1997 | Jaeger et al. | |
| 5,650,255 A | 7/1997 | Ng et al. | |
| 5,650,256 A | 7/1997 | Veregin et al. | |
| 5,679,138 A | 10/1997 | Bishop et al. | |
| 5,723,253 A | 3/1998 | Higashino et al. | |
| 5,728,797 A | 3/1998 | O'Dell et al. | |
| 5,744,520 A | 4/1998 | Kmiecik-Lawrynowicz et al. | |
| 5,747,215 A | 5/1998 | Ong et al. | |
| 5,763,133 A | 6/1998 | Ong et al. | |
| 5,766,818 A | 6/1998 | Smith et al. | |
| 5,804,349 A | 9/1998 | Ong et al. | |
| 5,827,633 A | 10/1998 | Ong et al. | |
| 5,840,462 A | 11/1998 | Foucher et al. | |
| 5,853,943 A | 12/1998 | Cheng et al. | |
| 5,853,944 A | 12/1998 | Foucher et al. | |
| 5,869,215 A | 2/1999 | Ong et al. | |
| 5,869,216 A | 2/1999 | Ong et al. | |
| 5,869,558 A | 2/1999 | Hou | |
| 5,916,725 A | 6/1999 | Patel et al. | |
| 5,928,830 A | 7/1999 | Cheng et al. | |
| 5,945,245 A | 8/1999 | Mychajlowskij et al. | |
| 6,103,006 A | 8/2000 | DiPietro | |
| 6,120,967 A | 9/2000 | Hopper et al. | |
| 6,130,021 A | 10/2000 | Patel et al. | |
| 6,174,937 B1 | 1/2001 | Banning et al. | |
| 6,268,222 B1 | 7/2001 | Chandler et al. | |
| 6,294,306 B1 | 9/2001 | Kmiecik-Lawrynowicz et al. | |
| 6,309,787 B1 | 10/2001 | Cheng | |
| 6,399,713 B1 | 6/2002 | MacQueen et al. | |
| 6,413,692 B1 | 7/2002 | Cheng | |
| 6,447,974 B1 | 9/2002 | Chen et al. | |
| 6,458,501 B1 | 10/2002 | Cheng et al. | |
| 6,492,458 B1 | 12/2002 | Pavlin | |
| 6,537,364 B2 | 3/2003 | Dietz et al. | |
| 6,547,380 B2 | 4/2003 | Smith et al. | |
| 6,837,918 B2 | 1/2005 | Pozarnsky et al. | |
| 6,860,930 B2 | 3/2005 | Wu et al. | |
| 6,867,251 B2 * | 3/2005 | Wang et al. | 524/190 |
| 6,870,011 B2 | 3/2005 | MacQueen et al. | |
| 6,902,613 B2 | 6/2005 | Bäbler | |
| 6,906,118 B2 | 6/2005 | Goodbrand et al. | |
| 7,037,633 B2 | 5/2006 | Hopper et al. | |
| 7,160,380 B2 | 1/2007 | Maeta et al. | |
| 7,270,408 B2 | 9/2007 | Odell et al. | |
| 7,293,868 B2 | 11/2007 | Odell et al. | |
| 7,427,323 B1 | 9/2008 | Birau et al. | |
| 7,560,161 B2 * | 7/2009 | Qi et al. | 428/403 |
| 7,649,026 B2 | 1/2010 | Allen et al. | |
| 7,834,072 B2 | 11/2010 | Carlini et al. | |
| 7,897,653 B2 | 3/2011 | Iftime et al. | |
| 2002/0131941 A1 * | 9/2002 | Habeck et al. | 424/63 |
| 2003/0055178 A1 * | 3/2003 | Gore et al. | 525/242 |
| 2003/0199608 A1 | 10/2003 | Kamigaki et al. | |
| 2004/0063848 A1 | 4/2004 | Olson et al. | |
| 2004/0261657 A1 | 12/2004 | Wu et al. | |
| 2005/0075453 A1 * | 4/2005 | Mathauer et al. | 524/801 |
| 2005/0186443 A1 * | 8/2005 | Marrocco et al. | 428/690 |
| 2006/0063873 A1 | 3/2006 | Lin et al. | |
| 2006/0144290 A1 * | 7/2006 | Polk et al. | 106/31.65 |
| 2006/0158491 A1 | 7/2006 | Belelie et al. | |
| 2006/0158492 A1 | 7/2006 | Odell et al. | |
| 2006/0159850 A1 | 7/2006 | Breton et al. | |
| 2006/0240353 A1 | 10/2006 | Matsumura et al. | |
| 2006/0293409 A1 | 12/2006 | Sanchez et al. | |
| 2007/0012221 A1 | 1/2007 | Maeta et al. | |
| 2007/0020542 A1 | 1/2007 | Patel | |
| 2007/0082980 A1 * | 4/2007 | Lai et al. | 524/35 |
| 2007/0120921 A1 | 5/2007 | Carlini et al. | |
| 2007/0120924 A1 | 5/2007 | Odell et al. | |
| 2008/0087190 A1 | 4/2008 | Iftime et al. | |
| 2008/0090928 A1 | 4/2008 | Iftime et al. | |
| 2008/0182193 A1 | 7/2008 | Agur et al. | |
| 2008/0302272 A1 | 12/2008 | Allen et al. | |
| 2008/0306189 A1 * | 12/2008 | Carlini et al. | 524/95 |
| 2008/0306193 A1 | 12/2008 | Allen et al. | |
| 2009/0155712 A1 * | 6/2009 | Sacripante et al. | 430/137.22 |
| 2009/0214972 A1 * | 8/2009 | Wosnick et al. | 430/108.2 |

FOREIGN PATENT DOCUMENTS

| | | |
|---|---|---|
| EP | 1 736 514 A1 | 12/2006 |
| GB | 1442835 | 7/1976 |
| GB | 2 238 792 A | 6/1991 |
| JP | A-2002-285058 | 10/2002 |
| JP | A-2005-238342 | 9/2005 |
| JP | A-2007-23168 | 2/2007 |
| JP | A-2007-23169 | 2/2007 |
| WO | WO 94/11446 | 5/1994 |
| WO | WO 2004/048482 | 6/2004 |
| WO | WO 2006/005521 | 1/2006 |
| WO | WO 2006/005536 | 1/2006 |
| WO | WO 2006/011467 | 2/2006 |
| WO | WO 2006/024103 | 3/2006 |
| WO | WO 2006/132443 | 12/2006 |
| WO | WO 2009/126388 A1 | 10/2009 |

OTHER PUBLICATIONS

Nov. 20, 2009 Office Action issued in U.S. Appl. No. 12/245,824.
Nov. 16, 2009 Search Report issued in 09171060.8.
U.S. Appl. No. 12/245,824, filed Oct. 6, 2008, Maria Birau et al.
U.S. Appl. No. 12/245,820, filed Oct. 6, 2008, Gabriel Iftime et al.
U.S. Appl. No. 12/245,782, filed Oct. 6, 2008, Gabriel Iftime et al.
U.S. Appl. No. 12/246,120, filed Oct. 6, 2008, Maria Birau et al.
Office Action for corresponding Canadian Patent Application No. 2,680,954, mailed on May 9, 2011.
May 12, 2010 Office Action issued in U.S. Appl. No. 12/245,824.
Jun. 29, 2010 Advisory Action issued in U.S. Appl. No. 12/245,824.
Jun. 24, 2011 Office Action issued in U.S. Appl. No. 12/245,782.
Sep. 16, 2011 Office Action issued in U.S. Appl. No. 12/246,120.
Nov. 10, 2011 Office Action issued in U.S. Appl. No. 12/245,820.
Oct. 14, 2011 Office Action issued in U.S. Appl. No. 12/245,782.

* cited by examiner

FLUORESCENT ORGANIC NANOPARTICLES AND A PROCESS FOR PRODUCING FLUORESCENT ORGANIC NANOPARTICLES

RELATED APPLICATIONS

Commonly assigned, U.S. patent application Ser. No. 11/187,007, filed Jul. 22, 2005, describes a toner comprising particles of a resin, a colorant, an optional wax, and a polyion coagulant, wherein said toner is prepared by an emulsion aggregation process.

Commonly assigned, U.S. patent application Ser. No. 10/606,298, filed Jun. 25, 2003, which has matured into U.S. Pat. No. 7,037,633, describes a toner process comprised of a first heating of a mixture of an aqueous colorant dispersion, an aqueous latex emulsion, and an aqueous wax dispersion in the presence of a coagulant to provide aggregates, adding a base followed by adding an organic sequestering agent, and thereafter accomplishing a second heating, and wherein said first heating is below the latex polymer glass transition temperature (Tg), and said second heating is above about the latex polymer Tg.

Commonly assigned, U.S. patent application Ser. No. 11/626,977, filed Jan. 25, 2007, describes a polyester resin emulsion comprising crosslinked polyester resin in an emulsion medium, the crosslinked polyester resin having a degree of crosslinking of from about 0.1 percent to about 100 percent.

Commonly assigned, U.S. patent application Ser. No. 11/548,774, filed Oct. 12, 2006, describes an ink set comprised of at least one radiation curable fluorescent ink comprising at least one curable monomer or oligomer, optionally at least one photoinitiator, and at least one fluorescent material, wherein upon exposure to activating energy, the fluorescent material fluoresces to cause a visible change in the appearance of the ink.

Commonly assigned, U.S. patent application Ser. No. 11/548,775, filed Oct. 12, 2006, describes an ink set comprised of at least one fluorescent phase change ink comprising at least one fluorescent material, wherein upon exposure to activating energy, the fluorescent material fluoresces to cause a visible change in the appearance of the ink.

The appropriate components, for example, waxes, coagulants, resin latexes, surfactants, and colorants, and processes of the above copending applications and patents may be selected for the present disclosure in embodiments thereof. The entire disclosures of the above-mentioned applications are totally incorporated herein by reference.

TECHNICAL FIELD

This disclosure is generally directed to fluorescent organic nanoparticles comprising a fluorescent dye and processes for preparing fluorescent organic nanoparticles.

REFERENCES

Suitable polymer matrices include polymers made from polycondensation of p-toluene-sulfonamide with melamine formaldehyde resins as described in U.S. Pat. Nos. 2,938,873; 2,809,954; and 5,728,797, the disclosures of which are totally incorporated herein by reference.

Polyamides matrices are described resulting from condensation of a diamine with a diacid (U.S. Pat. No. 5,094,777) or from polycarboxilic acid with aminoalcohols (U.S. Pat. No. 4,975,220), polyesters (U.S. Pat. No. 5,264,153) or copolymers of ethylene carbon monoxide (U.S. Pat. No. 5,439,971) are described.

Hu et. al. describe nanocolorants (dye dissolved in crosslinked polymer nanoparticles) fabricated by a mini-emulsion polymerization process of a monomer in presence of a crosslinking agent. (Z. Hu, et. al., Dyes and Pigments 76 (2008) 173-178).

A number of fluorescent particles of a size less than 200 nm are made by the so-called staining method in order to avoid surface functionalization to provide particles which are robust against thermal or chemical degradation (U.S. Pat. No. 4,714,682 describes a method of calibrating a flow cytometer or fluorescent microscope based on a set of highly uniform microbeads (with diameter of less than 5 microns) associated with a fluorescent dye; EP 1736514 describes fluorescent nanoparticles having a diameter between about 30 nm and about 100 nm.

U.S. Pat. No. 5,073,498 describes a staining process in which swelling is performed on polymer microparticles made of polystyrene in the presence of a fluorescent dye; this process provides particles containing fluorescent dye essentially on the surface, not uniformly distributed within the particles.

U.S. Pat. No. 6,268,222 describes large microparticles (several microns) having surface fluorescent nanoparticles made by a staining method. With respect to the nanoparticles component, dye present only on the surface does not provide stability against thermal, light or chemical agents.

Active Motif Chromeon (Germany) and Sigma-Aldrich (Fluka) produce water dispersible fluorescent nanoparticles (less than 100 nm) usable for biological assays.

U.S. Pat. Nos. 3,455,856 and 3,642,650 describe methods of producing liquid-based inks having fluorescent particles less than 1 micron. The particles are dispersible in water, but not in organic solvents. No particle functionalization process is described and the particles (alkyd resins copolymerized with melamine formaldehyde) are not dispersible in organic solvents.

U.S. Pat. No. 5,294,664 describes water dispersible particles "not greater than 1 micron" obtained by emulsion polymerization of polystyrene incorporating fluorescent dye. The particles are not robust and are not dispersible in organic solvents.

BACKGROUND

Fluorescent inks and toners are among the most widely used security printing features. A printed document is usually authenticated by detecting the light emitted by the fluorescent component when subjected to black light. The light emitting property cannot be reproduced in a second generation copy.

Fluorescent dyes used in fluorescent inks and toners can lose fluorescence in the print-head when the ink is heated to a temperature greater than 120° C. to melt during normal operation. To overcome this problem, the security printing industry uses hard, robust pigments containing the dye of interest. Pigments are preferred over fluorescent dyes because of their improved chemical, light fastening and thermal stability. Pigments are also preferred by the industry because there is limited or no migration or bleeding of the dye compound.

Most commercially available fluorescent pigments are made by grinding a bulk polymer matrix containing fluorescent materials. This process does not result in fluorescent particles of a size smaller than 1-2 microns, and typically the size of these particles is about 4-5 microns. According to this process, fluorescent dyes are incorporated into hard, crosslinked particles, thereby limiting the mobility of the fluorescent dye. Once the fluorescent dye is isolated from interaction with other materials present in the ink and, chemical degradation by the environment is diminished. These hard particles are dispersed in the marking material, typically liquid inks.

Inks based on fluorescent pigments are currently used in rotogravure, flexographic, silk-screening and off-set printing systems. However, given their large size, pigments cannot be used with inkjet, solid ink or UV curable inks, because they physically clog the inkjet nozzles. In addition, pigments are unsuitable for fabrication of Emulsion Aggregation (EA) toners since the size of the fluorescent particles is about the size of the toner particles.

There is a need in the art for fluorescent compositions, including fluorescent compositions that can be used in/with inkjet, solid ink, UV curable inks and EA toners and that have suitable thermal degradation properties. There is a further need for fluorescent compositions of such small size that can be used in/with inkjet, solid ink, UV curable inks and EA toners and are compatible with organic based marking materials.

SUMMARY

Disclosed herein is a fluorescent organic nanoparticle, comprising a polymeric matrix comprising one or more crosslinked polymer resins and one or more fluorescent dyes, wherein the fluorescent yes are incorporated into the polymer matrix and the fluorescent organic nanoparticles have a size of less than 500 nanometers (nm), such as less than about 200 nm, or less than about 100 nm. In some embodiments, the organic nanoparticles are hard, robust particles that are dispersible in organic solvents.

Also described herein are processes for producing fluorescent organic nanoparticles including preparing a polymer matrix comprising one or more polymer resins and one or more fluorescent dyes, wherein the fluorescent organic nanoparticles have a size of less than about 500 nm, such as less than about 200 nm, or less than about 100 nm. In one embodiment, the present disclosure provides a method for producing fluorescent organic nanoparticles comprising preparing a polymer latex or emulsion comprising one or more polymer resins and one or more fluorescent dyes dispersed in the polymer latex or emulsion; and crosslinking the polymer resins to form a polymer matrix, wherein the fluorescent organic nanoparticles have a size of less than about 500 nm, such as less than about 200 nm, or less than about 100 nm.

Also disclosed herein are ink compositions comprising the fluorescent organic nanoparticles of the present disclosure. In particular embodiments, the fluorescent organic nanoparticles of the present disclosure are used in inkjet compositions.

EMBODIMENTS

As used herein "fluorescent organic nanoparticles" describe a polymer matrix comprising one or more polymer resins, including one or more crosslinked resins, and one or more fluorescent dyes dispersed inside the resin matrix. The fluorescent organic nanoparticles are of a maximum size less than about 500 nm, such as less than about 200 nm, or less than about 100 nm as measured with a Nicomp Particle analyzer. In particular embodiments, the fluorescent organic nanoparticles are robust, hard particles and are dispersible in organic solvents.

As used herein "disperse," "dispersible," and "dispersion" refer to the ability of the individual nanoparticle(s) to exist in solution without completely dissociating into the representative individual molecules that assembled to form the individual nanoparticle(s).

The term "substantially colorless" as used herein refers to the transparency of the nanoparticles dispersed in a solvent. Specifically, the nanoparticles are substantially colorless when a substantial portion of the individual nanoparticles dispersed in a solvent are undetectable upon visual inspection.

The "average" particle size, typically represented as $D_{50}$, is defined as the median particle size value at the 50th percentile of the particle size distribution, wherein 50% of the particles in the distribution are greater than the $D_{50}$ particle size value and the other 50% of the particles in the distribution are less than the $D_{50}$ value. Average particle size can be measured by methods that use light scattering technology to infer particle size, such as Dynamic Light Scattering with a Nicomp Particle analyzer.

Geometric standard deviation is a dimensionless number that typically estimates a population's dispersion of a given attribute (for instance, particle size) about the median value of the population and is derived from the exponentiated value of the standard deviation of the log-transformed values. If the geometric mean (or median) of a set of numbers $\{A_1, A_2, \ldots, A_n\}$ is denoted as $\mu_g$, then the geometric standard deviation is calculated as:

$$\sigma_g = \exp\sqrt{\frac{\sum_{i=1}^{n}(\ln A_i - \ln\mu_g)^2}{n}}$$

The small size of the fluorescent organic nanoparticles permits the dye particles to be used with inkjet compositions while avoiding physical clogging of the inkjet nozzles.

In a particular embodiment, the fluorescent organic nanoparticles may be prepared by preparing a polymer matrix comprising one or more resins, including one or more crosslinked resins, and one or more fluorescent dyes dispsered in the polymer matrix. The one or more fluorescent dyes may be uniformly dispersed in the polymer matrix.

In another particular embodiment, the organic nanoparticles are prepared by preparing a polymer latex or emulsion comprising one or more crosslinking resins and one or more fluorescent dyes; and crosslinking the polymer resins to form organic nanoparticles comprising the one or more fluorescent dyes dispersed in a polymer matrix, and wherein the fluorescent organic nanoparticles are of a size less than about 500 nm, such as less than about 200 nm, or less than about 100 nm.

Fluorescent dyes which may be used include any fluorescent dye that is soluble or dispersible in the polymer latex or emulsion. The one or more fluorescent dyes comprises from about 0.01 to about 50 weight percent to total weight of the nanoparticle, such as from about 1 to about 40 weight percent to total weight of the nanoparticle, or from about 3 to about 20 weight percent to total weight of the nanoparticle. Examples of suitable fluorescent dyes include, for example, aryl-acetylenes, 2,5-diaryl-oxazoles, 1,2,3-oxadiazoles, aryl-substituted 2-pyrazolidines, xanthones, thioxanthones and acridones, benzazoles, benzotriazoles, benzoquinolines, fluoresceine derivatives, derivatives of phenothiazine, phenoxazine, quinine derivatives (including quinine derivatives having fused aromatic rings), coumarins, indigo derivatives, derivatives of naphthalic anhydride and naphthalimide, perilenes and the like.

Other fluorescent dyes that may be used in the nanoparticles include fluorescent compounds or dyes that are invisible to the naked eye referred to herein as "invisible fluorescent dyes." Examples of such invisible fluorescent dyes include those that are invisible under ambient light but emit bright colors under black light, for example, those emitting green, yellow, red and orange light may also be used. Examples of such compounds include Near IR emitting compounds and dyes such as coordination compounds of organic lanthanides as described, for example, in U.S. Pat. No. 5,435,937, which is hereby incorporated by reference in its entirety. Near IR fluorescent lanthanides are fluorescence compounds which cannot be seen by the naked eye. Examples of IR emitting organic dyes are described, for example, in U.S. Pat. No. 5,093,147, which is hereby incorporated by reference in its entirety.

Suitable resins include, for example, an amorphous resin or a mixture of amorphous resins having a Tg over about 180° C., such as a Tg over about 200° C. or a Tg over about 220° C., an amorphous resin or mixture of amorphous resins with a Tg lower than about 180° C., such as a Tg over about 200° C. or a Tg over about 220° C. as long as a crosslinker is present so that the resulting Tg of the resin is higher than about 180° C., such as a Tg over about 200° C. or a Tg over about 220° C., and a crystalline polymer or crystalline polymer mixture as long as the melting temperature of the polymer binder is greater than about 180° C., such as the melting temperature of the polymer binder is greater than about 200° C. or the melting temperature of the polymer binder is greater than about 220° C.

Examples of suitable amorphous polyesters include, for example, polyethylene-terephthalate, polypropylene-terephthalate, polybutylene-terephthalate, polypentylene-terephthalate, polyhexalene-terephthalate, polyheptadene-terephthalate, polyoctalene-terephthalate, polyethylene-sebacate, polypropylene-sebacate, polybutylene-sebacate, polyethylene-adipate, polypropylene-adipate, polybutylene-adipate, polypentylene-adipate, polyhexalene-adipate, polyheptadene-adipate, polyoctalene-adipate, polyethylene-glutarate, polypropylene-glutarate, polybutylene-glutarate, polypentylene-glutarate, polyhexalene-glutarate, polyheptadene-glutarate, polyoctalene-glutarate, polyethylene-pimelate, polypropylene-pimelate, polybutylene-pimelate, polypentylene-pimelate, polyhexalene-pimelate, polyheptadene-pimelate, poly(propoxylated bisphenol-fumarate), poly(propoxylated bisphenol-succinate), poly(propoxylated bisphenol-adipate), poly(propoxylated bisphenol-glutarate), SPAR™ (Dixie Chemicals), BECKOSOL™ (Reichhold Inc), ARAKOTE™ (Ciba-Geigy Corporation), HETRON™ (Ashland Chemical), PARAPLEX™ (Rohm & Hass), POLYLITE™ (Reichhold Inc), PLASTHALL™ (Rohm & Hass), CYGAL™ (American Cyanamide), ARMCO™ (Armco Composites), ARPOL™ (Ashland Chemical), CELANEX™ (Celanese Eng), RYNITE™ (DuPont), STYPOL™ (Freeman Chemical Corporation), combinations thereof and the like. The resins may also be functionalized, such as carboxylated, sulfonated, or the like, and such as sodio sulfonated, if desired.

Illustrative examples of crystalline polymer resins include any of the various crystalline polyesters, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), copoly(5-sulfoisophthaloyl)-copoly(ethylene-adipate), copoly(5-sulfoisophthaloyl)-copoly(propylene-adipate), copoly(5-sulfoisophthaloyl)-copoly(butylene-adipate), copoly(5-sulfo-isophthaloyl)-copoly(pentylene-adipate), copoly(5-sulfo-isophthaloyl)-copoly(hexylene-adipate), copoly(5-sulfo-isophthaloyl)-copoly(octylene-adipate), copoly(5-sulfo-isophthaloyl)-copoly(ethylene-adipate), copoly(5-sulfo-isophthaloyl)-copoly(propylene-adipate), copoly(5-sulfo-isophthaloyl)-copoly(butylene-adipate), copoly(5-sulfo-isophthaloyl)-copoly(pentylene-adipate), copoly(5-sulfo-isophthaloyl)-copoly(hexylene-adipate), copoly(5-sulfo-isophthaloyl)-copoly(octylene-adipate), copoly(5-sulfoisophthaloyl)-copoly(ethylene-succinate), copoly(5-sulfoisophthaloyl)-copoly(propylene-succinate), copoly(5-sulfoisophthaloyl)-copoly(butylene-succinate), copoly(5-sulfoisophthaloyl)-copoly(pentylene-succinate), copoly(5-sulfoisophthaloyl)-copoly(hexylene-succinate), copoly(5-sulfo-isophthaloyl)-copoly(octylene-succinate), copoly(5-sulfo-isophthaloyl)-copoly(ethylene-sebacate), copoly(5-sulfo-isophthaloyl)-copoly(propylene-sebacate), copoly(5-sulfo-isophthaloyl)-copoly(butylenes-sebacate), copoly(5-sulfo-isophthaloyl)-copoly(pentylene-sebacate), copoly(5-sulfo-isophthaloyl)-copoly(hexylene-sebacate), copoly(5-sulfo-isophthaloyl)-copoly(octylene-sebacate), copoly(5-sulfo-isophthaloyl)-copoly(ethylene-adipate), copoly(5-sulfo-isophthaloyl)-copoly(propylene-adipate), copoly(5-sulfo-isophthaloyl)-copoly(butylene-adipate), copoly(5-sulfo-isophthaloyl)-copoly(pentylene-adipate), copoly(5-sulfo-isophthaloyl)-copoly(hexylene-adipate), and poly(octylene-adipate).

The crystalline resins may be prepared, for example, by a polycondensation process by reacting suitable organic diol(s) and suitable organic diacid(s) in the presence of a polycondensation catalyst. Generally, a stoichiometric equimolar ratio of organic diol and organic diacid is utilized; however, in some instances, where the boiling point of the organic diol is from about 180° C. to about 230° C., an excess amount of diol can be utilized and removed during the polycondensation process. The amount of catalyst utilized varies, and can be selected in an amount, for example, of from about 0.01 to about 1 mole percent of the resin. Additionally, in place of the organic diacid, an organic diester can also be selected, where an alcohol byproduct is generated.

Examples of organic diols include aliphatic diols with from about 2 to about 36 carbon atoms, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, and the like; alkali sulfo-aliphatic diols such as sodio 2-sulfo-1,2-ethanediol, lithio 2-sulfo-1,2-ethanediol, potassio 2-sulfo-1,2-ethanediol, sodio 2-sulfo-1,3-propanediol, lithio 2-sulfo-1,3-propanediol, potassio 2-sulfo-1,3-propanediol, mixture thereof, and the like. The aliphatic diol is, for example, selected in an amount of from about 45 to about 50 mole percent of the resin, and the alkali sulfo-aliphatic diol can be selected in an amount of from about 1 to about 10 mole percent of the resin.

Examples of organic diacids or diesters selected for the preparation of the crystalline polyester resins include oxalic acid, succinic acid, glutaric acid, adipic acid, suberic acid, azelaic acid, sebacic acid, phthalic acid, isophthalic acid, terephthalic acid, napthalene-2,6-dicarboxylic acid, naphthalene-2,7-dicarboxylic acid, cyclohexane dicarboxylic acid, malonic acid, mesaconic acid, and diesters or anhydrides thereof; and an alkali sulfo-organic diacid such as the sodio, lithio or potassium salt of dimethyl-5-sulfo-isophthalate, dialkyl-5-sulfo-isophthalate-4-sulfo-1,8-naphthalic anhydride, 4-sulfo-phthalic acid, dimethyl-4-sulfo-phthalate, dialkyl-4-sulfo-phthalate, 4-sulfophenyl-3,5-dicarbomethoxybenzene, 6-sulfo-2-naphthyl-3,5-dicarbomethoxybenzene, sulfo-terephthalic acid, dimethyl-sulfo-terephthalate, 5-sulfo-isophthalic acid, dialkyl-sulfo-terephthalate, sulfoethanediol, 2-sulfopropanediol, 2-sulfobutanediol, 3-sulfopentanediol, 2-sulfohexanediol, 3-sulfo-2-methylpentanediol, 2-sulfo-3,3-dimethylpentanediol, sulfo-p-hydroxybenzoic acid, N,N-bis(2-hydroxyethyl)-2-amino ethane sulfonate, or mixtures thereof. The organic diacid is selected in an amount of, for example, from about 40 to about 50 mole percent of the resin, and the alkali sulfoaliphatic diacid can be selected in an amount of from about 1 to about 10 mole percent of the resin.

Linear amorphous polyester resins may be prepared, for example, by the polycondensation of an organic diol, a diacid or diester, and a polycondensation catalyst. For the branched amorphous sulfonated polyester resin, the same materials may be used, with the further inclusion of a branching agent such as a multivalent polyacid or polyol. The amorphous resin is present in various suitable amounts, such as from about 60 to about 90 weight percent, or from about 50 to about 65 weight percent, of the solids.

Examples of diacid or diesters selected for the preparation of amorphous polyesters include dicarboxylic acids or diesters selected from the group consisting of terephthalic acid, phthalic acid, isophthalic acid, fumaric acid, maleic acid, itaconic acid, succinic acid, succinic anhydride, dodecylsuccinic acid, dodecylsuccinic anhydride, glutaric acid, glutaric anhydride, adipic acid, pimelic acid, suberic acid, azelic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and mixtures thereof. The organic diacid or diester is selected, for example, from about 45 to about 52 mole percent of the resin. Examples of diols utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hyroxypropyl)-bisphenol A, 1,4-cyclohexanedimethanol, 1,3-cyclohexanedimethanol, xylenedimethanol, cyclohexanediol, diethylene glycol, bis(2-hydroxyethyl) oxide, dipropylene glycol, dibutylene, and mixtures thereof. The amount of organic diol selected can vary, for example, from about 45 to about 52 mole percent of the resin.

Branching agents used in forming the branched amorphous sulfonated polyester include, for example, a multivalent polyacid such as 1,2,4-benzene-tricarboxylic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,3-dicarboxyl-2-methyl-2-methylene-carboxylpropane, tetra(methylene-carboxyl)methane, and 1,2,7,8-octanetetracarboxylic acid, acid anhydrides thereof, and lower alkyl esters of the general formula RCOOR', where R and R' include from 1 to 6 carbon atoms; a multivalent polyol such as sorbitol, 1,2,3,6-hexanetetrol, 1,4-sorbitane, pentaerythritol, dipentaerythritol, tripentaerythritol, sucrose, 1,2,4-butanetriol, 1,2,5-pentatriol, glycerol, 2-methylpropanetriol, 2-methyl-1,2,4-butanetriol, trimethylolethane, trimethylolpropane, 1,3,5-trihydroxymethylbenzene, mixtures thereof, and the like. The branching agent amount selected is, for example, from about 0.1 to about 5 mole percent of the resin.

Examples of suitable polycondensation catalyst for either the crystalline or amorphous polyesters include tetraalkyl titanates, dialkyltin oxide such as dibutyltin oxide, tetraalkyltin such as dibutyltin dilaurate, dialkyltin oxide hydroxide such as butyltin oxide hydroxide, aluminum alkoxides, alkyl zinc, dialkyl zinc, zinc oxide, stannous oxide, or mixtures thereof; these catalysts are selected in amounts of, for example, from about 0.01 mole percent to about 5 mole percent based on the starting diacid or diester used to generate the polyester resin.

Linear or branched unsaturated polyesters selected for the in-situ preparation of the crosslinked particles and process of the present disclosure include low molecular weight condensation polymers that may be formed by step-wise reactions between both saturated and unsaturated diacids (or anhydrides) and dihydric alcohols (glycols or diols). The resulting unsaturated polyesters are reactive (for example, crosslinkable) on two fronts: (i) unsaturation sites (double bonds) along the polyester chain, and (ii) functional groups such as carboxyl, hydroxy, and the like groups amenable to acid-base reactions.

Typical unsaturated polyester resins useful for the present disclosure are prepared by melt polycondensation or other polymerization processes using diacids and/or anhydrides and diols.

Suitable diacids and dianhydrides include, but are not limited to, saturated diacids and/or dianhydrides such as for example succinic acid, glutaric acid, adipic acid, pimelic acid, suberic acid, azelaic acid, sebacic acid, isophthalic acid, terephthalic acid, hexachloroendo methylene tetrahydrophthalic acid, phthalic anhydride, chlorendic anhydride, tetrahydrophthalic anhydride, hexahydrophthalic anhydride, endomethylene tetrahydrophthalic anhydride, tetrachlorophthalic anhydride, tetrabromophthalic anhydride, and the like and mixtures thereof; and unsaturated diacids and/or anhydrides such as, for example, maleic acid, fumaric acid, chloromaleic acid, methacrylic acid, acrylic acid, itaconic acid, citraconic acid, mesaconic acid, maleic anhydride, and the like and mixtures thereof.

Suitable diols include, but are not limited to, for example, propylene glycol, ethylene glycol, diethylene glycol, neopentyl glycol, dipropylene glycol, dibromoneopentyl glycol, propoxylated bisphenol A, 2,2,4-trimethylpentane-1,3-diol, tetrabromo bisphenol dipropoxy ether, 1,4-butanediol, and the like and mixtures thereof. Preferred unsaturated polyester resins are prepared from diacids and/or anhydrides such as, for example, maleic anhydride, fumaric acid, and the like and mixtures thereof, and diols such as, for example, propoxylated bisphenol A, propylene glycol, and the like and mixtures thereof.

Monomers used in making the selected polymer are not limited, and the monomers utilized may include any one or more of, for example, ethylene, propylene, and the like. Known chain transfer agents, for example, dodecanethiol or carbon tetrabromide, can be utilized to control the molecular weight (Mw) properties of the polymer.

The resin or resins are included in the organic nanoparticle in an amount from about 50 to about 99.99 weight percent to total weight of the nanoparticle, such as from about 60 to about 99 weight percent to total weight of the nanoparticle, or from about 80 to about 97 weight percent to total weight of the nanoparticle. However, amounts outside of these ranges can be used in embodiments, depending upon the type and amounts of other materials present.

In a embodiment, forming the crosslinked resin emulsion is accomplished by dissolving the unsaturated polyester resin and an initiator in a suitable organic solvent under conditions that allow the solution to be formed. Suitable solvents that can be used include those in which the resin and any other optional components (such as a wax) are soluble, and that dissolves the resin component to form an emulsion, but which solvents can be subsequently evaporated-off to leave the resin in an emulsion, such as in water, at a specific particle size. For example, suitable solvents include alcohols, ketones, esters, ethers, chlorinated solvents, nitrogen containing solvents and mixtures thereof. Specific examples of suitable solvents include acetone, methyl acetate, methyl ethyl ketone, tetrahydrofuran, cyclohexanone, ethyl acetate, N,N dimethylformamide, dioctyl phthalate, toluene, xylene, benzene, dimethylsulfoxide, mixtures thereof, and the like. Particular solvents that can be used include acetone, methyl ethyl ketone, cyclohexanone, methyl acetate, ethyl acetate, dimethylsulfoxide, and mixtures thereof.

In a embodiment, the resin can be dissolved in the solvent at an elevated temperature, such as about 40 to about 80° C. or about 50 to about 70° or about 60 to about 65° C. For particular embodiments, the temperature is lower than the glass transition temperature of the resin. In a embodiments, the resin is dissolved in the solvent at an elevated temperature, but below the boiling point of the solvent, such as at about 2 to about 15° C. or about 5 to about 10° C. below the boiling point of the solvent.

In addition to the resin and organic solvent, an initiator is included that subsequently crosslinks the resin. Any suitable initiator can be used such as, for example, free radical or thermal initiators such as organic peroxides and azo compounds. Examples of suitable organic peroxides include diacyl peroxides such as, for example, decanoyl peroxide, lauroyl peroxide and benzoyl peroxide; ketone peroxides such as, for example, cyclohexanone peroxide and methyl ethyl ketone; alkyl peroxyesters such as, for example, t-butyl peroxy neodecanoate, 2,5-dimethyl 2,5-di(2-ethyl hexanoyl peroxy)hexane, t-amyl peroxy 2-ethyl hexanoate, t-butyl peroxy 2-ethyl hexanoate, t-butyl peroxy acetate, t-amyl peroxy acetate, t-butyl peroxy benzoate, t-amyl peroxy benzoate, oo-t-butyl o-isopropyl mono peroxy carbonate, 2,5-dimethyl 2,5-di(benzoyl peroxy)hexane, oo-t-butyl o-(2-ethyl hexyl) mono peroxy carbonate, and oo-t-amyl o-(2-ethyl hexyl) mono peroxy carbonate; alkyl peroxides such as, for example, dicumyl peroxide, 2,5-dimethyl 2,5-di(t-butyl peroxy)hexane, t-butyl cumyl peroxide, α-α-bis(t-butyl peroxy)diisopropyl benzene, di-t-butyl peroxide and 2,5-dimethyl 2,5di(t-butyl peroxy)hexyne-3, alkyl hydroperoxides such as, for example, 2,5-dihydro peroxy 2,5-dimethyl hexane, cumene hydroperoxide, t-butyl hydroperoxide and t-amyl hydroperoxide; and alkyl peroxyketals such as, for example, n-butyl 4,4-di(t-butyl peroxy)valerate, 1,1-di(t-butyl peroxy) 3,3,5-trimethyl cyclohexane, 1,1-di(t-butyl peroxy)cyclohexane, 1,1-di(t-amyl peroxy)cyclohexane, 2,2di(t-butyl peroxy)butane, ethyl 3,3-di(t-butyl peroxy)butyrate and ethyl 3,3-di(t-amyl peroxy)butyrate. Examples of suitable azo compounds include 2,2'-azobis(2,4-dimethylpentane nitrile, azobis-isobutyronitrile, 2,2'-azobis (isobutyronitrile), 2,2'-azobis (2,4-dimethyl valeronitrile), 2,2'-azobis (methyl butyronitrile), 1,1'-azobis (cyano cyclohexane) and other similar known compounds.

Although any suitable initiator can be used, in particular embodiments the initiator is an organic initiator that is soluble in the solvent, but not soluble in water. Further, the initiator should be "substantially non-reactive" at temperatures up to about 65 to about 70° C. such that "substantially no crosslinking" takes place until after the resin-solvent phase is well dispersed in the water phase. As used herein "substantially non-reactive" refers, for example, to "substantially no crosslinking" occurring between the polymer or resin material and the initiator which would affect the strength properties of the polymer or resin material. As used herein, "substantially no crosslinking" refers, for example, to less than about 1 percent, such as less than about 0.5 percent, or less than about 0.1 percent, cross linking between polymer chains in the resin.

In particular embodiments, a suitable amount of crosslinking monomer is added in order to provide improved robustness and hardness of the particles. Generally, the hardness of a particle correlates with the observed viscosity of a plurality of those particles. Therefore, an increase in the viscosity of a plurality of the particles would correspond to an increase in the hardness of the individual particles plurality of the particles. This is reflected in FIG. 1, where the viscosity of the crosslinked material is observed to be higher compared to the non-crossliked material. Confirming that crosslinking has occurred in the particles.

In particular embodiments, substantially all of the initiator should react during a solvent flashing step when the mixture is raised to above about the boiling point of the solvent, such as about 80° C. or more, to flash off the residual solvent. Thus, the choice of initiator can be directed by its half-life/temperature characteristic. For example, half-life/temperature characteristic plots for Vazo® 52 (2,2'-azobis(2,4-dimethylpentane nitrile, E. I. du Pont de Nemours and Company, USA) shows a half-life greater than 90 minutes at 65° C. and less than 20 minutes at 80° C., which indicates that the initiator is particularly suitable for carrying out the crosslinking in the present solvent flashing process, because substantially no crosslinking takes place during the initial mixing phase of resin and solvent at 65° C. and substantially all of the crosslinking occurs during the solvent flashing step at temperatures up to 80° C.

The initiator can be included in any suitable amount to provide a specific degree of crosslinking. The initiator may be included in an amount of, for example, from about 0.1 to about 20 percent by weight of unsaturated resin, such as from about 0.5 or from about 1 to about 10 or about 15 percent by weight of unsaturated resin. In an embodiment, about 3 to about 6 percent by weight initiator is added.

In some embodiments, in situ crosslinking process utilizes an unsaturated resin such as, for example, an unsaturated amorphous linear or branched polyester resin. In other embodiments, the polymer matrix is prepared by thermal (radical) initiated crosslinking. Useful free-radical thermal initiators include, for example, azo, peroxide, persulfate, and redox initiators, and combinations thereof.

Suitable azo initiators include, for example, 2,2'-azobis(4-methoxy-2,4-dimethylvaleronitrile) (available under the trade designation "VAZO 33"), 2,2'-azobis(2-amidinopropane)dihydrochloride (available under the trade designation "VAZO 50"), 2,2-azobis(2,4-dimethylvaleronitrile) (available under the trade designation "VAZO 52"), 2,2'-azobis (isobutyronitrile) (available under the trade designation "VAZO 64"), 2,2'-azobis-2-methylbutyronitrile (available under the trade designation "VAZO 67"), and 1,1'-azobis(1-cyclohexanecarbonitrile) (available under the trade designation "VAZO 88"), all of which are available from E.I. du Pont de Nemours and Company, Wilmington, Del.; and 2,2'-azobis (methyl isobutyrate) (available under the trade designation "V-601" from Wako Pure Chemical Industries, Ltd., Osaka, Japan).

Suitable peroxide initiators include, for example, benzoyl peroxide, acetyl peroxide, lauroyl peroxide, decanoyl peroxide, dicetyl peroxydicarbonate, di(4-t-butylcyclohexyl)peroxydicarbonate (available under the trade designation "PERKADOX 16", from Akzo Chemicals, Chicago, Ill.), di(2-ethylhexyl)peroxydicarbonate, t-butylperoxypivalate (available under the trade designation "LUPERSOL 11", from Lucidol Division, Atochem North America, Buffalo, N.Y.); t-butylperoxy-2-ethylhexanoate (available under the trade designation "TRIGONOX 21-C50" from Akzo Chemicals), and dicumyl peroxide.

Suitable persulfate initiators include, for example, potassium persulfate, sodium persulfate, and ammonium persulfate.

Suitable redox (oxidation-reduction) initiators include, for example, combinations of persulfate initiators with reducing agents including, for example, sodium metabisulfite and sodium bisulfite; systems based on organic peroxides and tertiary amines (e.g., benzoyl peroxide plus dimethylaniline); and systems based on organic hydroperoxides and transition metals (e.g., cumene hydroperoxide plus cobalt naphthenate).

After the resin and initiator are dissolved in the solvent, the resin and initiator solution is mixed into an emulsion medium, for example water such as deionized water containing a stabilizer, and optionally a surfactant. Examples of suitable stabilizers include water-soluble alkali metal hydroxides, such as sodium hydroxide, potassium hydroxide, lithium hydroxide, beryllium hydroxide, magnesium hydroxide, calcium hydroxide, or barium hydroxide; ammonium hydroxide; alkali metal carbonates, such as sodium bicarbonate, lithium bicarbonate, potassium bicarbonate, lithium carbonate, potassium carbonate, sodium carbonate, beryllium carbonate, magnesium carbonate, calcium carbonate, barium carbonate or cesium carbonate; and mixtures thereof. In a particular embodiment the stabilizer is sodium bicarbonate or ammonium hydroxide. When the stabilizer is used in the composition, it may be present at a level of from about 0.1 to about 5 percent, such as about 0.5 to about 3 percent by weight of the resin. In embodiments, when such salts are added to the composition as a stabilizer, incompatible metal salts are not present in the composition. For example, when these salts are used the composition may be completely or essentially free of zinc and other incompatible metal ions, e.g., Ca, Fe, Ba, etc., which form water-insoluble salts. The term "essentially free" refers, for example, to the incompatible metal ions as present at a level of less than about 0.01 percent, such as less than about 0.005 or less than about 0.001 percent by weight of the wax and resin. In particular embodiments, the stabilizer can be added to the mixture at ambient temperature, or it can be heated to the mixture temperature prior to addition.

Optionally, an additional stabilizer, such as a surfactant, may be added to the aqueous emulsion medium such as to afford additional stabilization to the resin particles, particularly if wax is also included in the emulsion, albeit at a reduced level as compared to conventional wax emulsions. Suitable surfactants include anionic, cationic and nonionic surfactants. In embodiments, the use of anionic and nonionic surfactants can additionally help stabilize the aggregation process in the presence of the coagulant, which otherwise could lead to aggregation instability.

Anionic surfactants include sodium dodecylsulfate (SDS), sodium dodecyl benzene sulfonate, sodium dodecylnaphthalene sulfate, dialkyl benzenealkyl, sulfates and sulfonates, abitic acid, and the NEOGEN brand of anionic surfactants. An example of a suitable anionic surfactant is NEOGEN R-K available from Daiichi Kogyo Seiyaku Co. Ltd. (Japan), or TAYCAPOWER BN2060 from Tayca Corporation (Japan), which consists primarily of branched sodium dodecyl benzene sulfonate.

Examples of cationic surfactants include dialkyl benzene alkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecyl benzyl triethyl ammonium chloride, MIRAPOL and ALKAQUAT available from Alkaril Chemical Company, SANISOL (benzalkonium chloride) available from Kao Chemicals, and the like. An example of a suitable cationic surfactant is SANISOL B-50 available from Kao Corporation, which consists primarily of benzyl dimethyl alkonium chloride.

Examples of nonionic surfactants include polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenc Inc. as IGEPAL CA-210, IGEPAL CA-520, IGEPAL CA-720, IGEPAL CO-890, IGEPAL CO-720, IGEPAL CO-290, IGEPAL CA-210, ANTAROX 890 and ANTAROX 897. An example of a suitable nonionic surfactant is ANTAROX 897 available from Rhone-Poulenc Inc., which consists primarily of alkyl phenol ethoxylate.

After the stabilizer or stabilizers are added, the resultant mixture can be mixed or homogenized for any specific time.

Next, the mixture is stirred and the solvent is evaporated off. Alternatively, the solvent may be flashed off. The solvent flashing can be conducted at any suitable temperature at or above about the boiling point of the solvent in water that will flash off the solvent, such as about 60 to about 100° C., for example, about 70 to about 90° C. or about 80° C., although the temperature may be adjusted based on, for example, the particular resin and solvent used.

Following the solvent evaporation (or flashing) step, the crosslinked polyester resin particles in embodiments have an average particle diameter in the range of about 20 to about 500 nm, such as from about 75 to 400 nm, or as from about 100 to about 200 nm as measured with a Nicomp Particle Analyzer.

The polyester resin latex or emulsion can be prepared by any suitable means. For example, the latex or emulsion can be prepared by taking the resin and heating it to its melting temperature and dispersing the resin in an aqueous phase containing a surfactant. The dispersion can be carried out by various dispersing equipment such as ultimizer, high speed homogenizer, or the like to provide submicron resin particles. Other ways to prepare the polyester resin latex or emulsion include solubilizing the resin in a solvent and adding it to heated water to flash evaporate the solvent. External dispersion can also be employed to assist the formation of emulsion as the solvent is being evaporated. Polyester resin emulsions prepared by other means or methods can also be utilized in the preparation of the toner composition.

Illustrative examples of such latex polymers include, but are not limited to, poly(styrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly (ethyl acrylate-butadiene), poly(propyl acrylate-butadiene), poly(butyl acrylate-butadiene), poly(styrene-isoprene), poly (methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-butylacrylate), poly(styrene-butadiene), poly(styrene-isoprene), poly(styrene-butyl methacrylate), poly(styrene-butyl acrylate-acrylic acid), poly (styrene-butadiene-acrylic acid), poly(styrene-isoprene-acrylic acid), poly(styrene-butyl methacrylate-acrylic acid), poly(butyl methacrylate-butyl acrylate), poly(butyl methacrylate-acrylic acid), poly(styrene-butyl acrylate-acrylonitrile-acrylic acid), poly(acrylonitrile-butyl acrylate-acrylic acid), poly(styrene-butyl acrylate-2-carboxyethyl acrylate), poly(styrene-butadiene-2-carboxyethyl acrylate), poly(styrene-isoprene-2-carboxyethyl acrylate), poly(styrene-butyl methacrylate-2-carboxyethyl acrylate), poly(butyl methacrylate-butyl acrylate-2-carboxyethyl acrylate), poly(butyl methacrylate-2-carboxyethyl acrylate), poly(styrene-butyl acrylate-acrylonitrile-2-carboxyethyl acrylate), poly(acrylonitrile-butyl acrylate-2-carboxyethyl acrylate), branched/partially crosslinked copolymers of the above, and the like.

Monomers may be mixed with water and surfactant to form an emulsion. The emulsification is generally accomplished at a temperature of about 5° C. to about 40° C. However, the emulsion may also be formed at higher temperatures in particular. To form an emulsion, the mixture is generally agitated using an appropriate mixing device, such as a vessel with an agitator having one or multiple impellers, a vessel containing a high speed agitator, such as a homogenizer, or a vessel equipped with an external loop containing an in-line mixing device. The mixing speed used to form an emulsion is determined by the type of device used. The time to form an emulsion is generally less if the mixture is agitated at a higher speed.

Surfactant used in forming the monomer emulsion may be any surfactant that will provide an emulsification and latex, and would not significantly affect negatively the toner functional properties. The surfactants that may be added include ionic and/or nonionic surfactants.

A chain transfer agent may be added to the monomer emulsion to control the Mw properties of the polymer to be formed. Suitable chain transfer agents include, but are not limited to, dodecanethiol, butanethiol, isooctyl-3-mercaptopropionate (IOMP), 2-methyl-5-t-butylthiophenol, carbon tetrachloride, carbon tetrabromide, and the like. Chain transfer agents may be used in any effective amount, such as from about 0.1 to about 10 percent by weight of the monomer in the monomer emulsion.

An advantage of the present disclosure is that the organic nanoparticles have suitable thermal degradation properties. Thus, the fluorescent organic nanoparticle of the present disclosure may be used for a variety of purposes, including for producing inks and the like. Examples of inks include inkjet inks and any other ink composition. Organic nanoparticles containing invisible fluorescent dyes may be used, for example, for fabrication of marking materials, for example, inkjet compositions used for security printing.

This disclosure refers to marking as a process of producing a pattern, such as text and/or images, on a substrate, such as paper or transparent plastic. A marking device performs the marking on the substrate with a marking material. Marking materials include ink, dye, or any other suitable marking material for marking on the substrate. The fluorescent organic nanoparticles of the present disclosure may also be used in any marking device, alone or in combination with other marking materials.

The organic fluorescent nanoparticles of the present disclosure are dispersible in solvents. In a particular embodiment, the fluorescent organic nanoparticles of the present disclosure may also be used in inkjet printing processes. Suitable solvents for inkjet applications include organic solvents like for example hydrocarbons like, for example, isopars, aromatic solvents like toluene, xylenes and mixtures thereof. Additional solvents for these fluorescent particles include water, glycols polyethylene glycols and the like, alcohols like ethanol, isopropyl alcohol and the like. Such compositions can be printed using an inkjet printer.

Any effective colorant, suitable for inkjet applications, can be employed in the inks of the present disclosure, including pigment, dye, mixtures of pigment and dye, mixtures of pigments, mixtures of dyes, and the like, provided that the colorant is of sufficiently small size that can be dissolved or dispersed in the ink marking material. The compositions can be used in combination with conventional ink colorant materials, such as Color Index (C.I.) Solvent Dyes, Disperse Dyes, modified Acid and Direct Dyes, Basic Dyes, Sulphur Dyes, Vat Dyes, and the like.

Examples of suitable dyes include Usharect Blue 86 (Direct Blue 86), available from Ushanti Color; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red H8B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF available from Clariant; Carta Blue 2GL, available from Clariant; and the like. In a particular embodiment, solvent dyes are used; in a specific embodiment, spirit soluble dyes are used because of their compatibility with the ink marking materials. Examples of suitable spirit solvent dyes include Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF), and the like. Neozapon Black X51 [C.I. Solvent Black, C.I. 12195] (BASF), Sudan Blue 670 [C.I. 61554] (BASF), Sudan Yellow 146 [C.I. 12700] (BASF), and Sudan Red 462 [C.I. 260501] (BASF) are particularly suitable in embodiments.

It should be appreciated that while fluorescent organic nanoparticles are disclosed, liquid developer materials employing fluorescent organic nanoparticles in a liquid carrier may also be used. Also, fluorescent organic nanoparticles may be used in marker devices and/or units that employ other marking materials compatible with specific output image receiving media may be employed.

EXAMPLES

The following examples describe the preparation of an organic fluorescent particle based on a luminescent lanthanide complex.

(1) Preparation of Polyester Latex.

190 grams of amorphous propoxylated bisphenol A fumarate resin (Mw=12,500, Tg onset=56.9, acid value=16.7; available commercially as SPAR resins from Reichhold Chemicals, Inc., RESAPOL HT resin from Resana S. A. along with 10 grams (g) of DFKY-C7 (Risk Reactor) fluorescent dye were weighed out in a 1 L kettle. 100 g of methyl ethyl ketone and 40 g of isopropanol were weighed out separately and mixed together in a beaker. The solvents were poured into the 1 L kettle containing the resin. The kettle, with its cover on, a gasket, a condenser and 2 rubber stoppers, were placed inside a water bath set at 48° C. for 1 hour. The anchor blade impeller was set up in the kettle and was switched on to rotate at approximately 150 RPM. After 3 hours, when all of the resins dissolved, 8.69 g of 10% $NH_4OH$ was added to the mixture drop-wise with a disposable pipette through a rubber stopper. The mixture was left to stir for 10 minutes. Then 8.0 g of Vazo 52 thermal initiator was added to the mixture and the mixture was stirred for an additional 10 minutes at 48° C. Next, 600 g of de-ionized water was to be added into the kettle by a pump through a rubber stopper. The first 400 g were added in 90 minutes with the pump set to a rate of 4.44 g/min. The last 200 g were added in 30 minutes with the pump set to 6.7 g/min. The apparatus was dismantled, and the mixture was poured into a glass pan, which was kept in the fume hood overnight and stirred by a magnetic stir-bar so that the solvent could evaporate off. When exposed to black light, the latex emitted red light. The particle size as measured by a Nicomp Particle Analyzer was 170 nm. This latex solution was labeled "Latex A."

(2) Preparation of Hard Particles by Crosslinking by Radical Initiation.

The above latex solution, Latex A, was charged into a 1 L 3-necked round bottom flask and purged with nitrogen gas for one hour. The mixture was then stirred at 200 RPM and heated to 80° C. and maintained at that temperature for 5 hours. At this temperature, the Vazo 52 initiator produced radicals which initiated a crosslinking reaction between the double bonds of the propoxylated bisphenol A fumarate resin. The latex was then cooled down and freeze-dried to obtain dry particles. When exposed to black light, the latex emitted red light. The size of the particles after the crosslinking reaction was 145 nm. These particles were labeled "Example 1."

Figure 1:
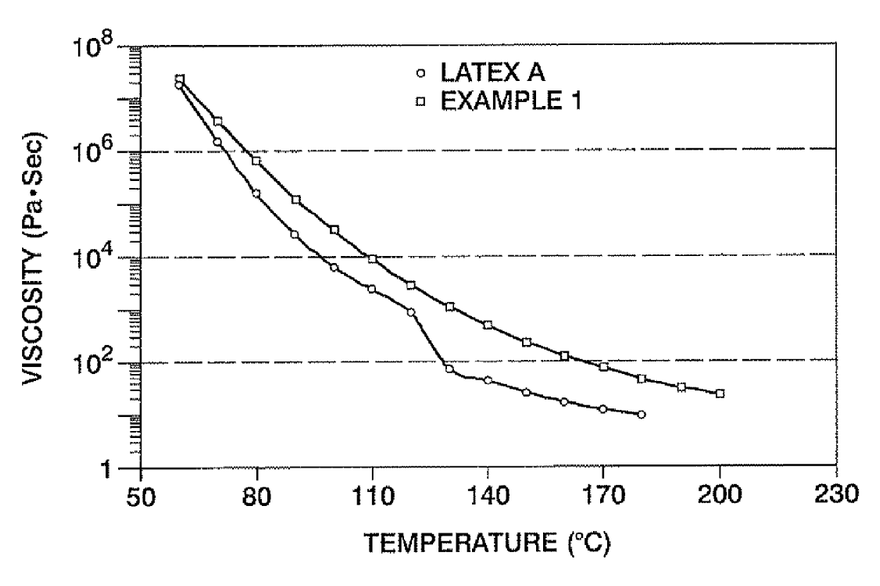
FIG. 1 provides a comparison of the viscosity of crosslinked fluorescent organic nanoparticles to the viscosity of non-crosslinked fluorescent particles.

Rheology shown in FIG. 1 shows that the crosslinked particles (Example 1) were more viscous compared to the non crosslinked particles (Latex A).

(3) Dispersion Tests with Organic Solvents

Example 1 was dispersed successfully in toluene and acetone solvents, providing substantially colorless solutions. When exposed to black light Example 1 emitted red light. There was a shift in the emitted color of the crosslinked particles when compared with just fluorescent dye dissolved in the solvent or in the solvent containing uncrosslinked fluorescent particles. The particles were not dispersible in more polar solvents like ethanol and isopropanol.

(4) Printing Tests

A printing composition was prepared by dispersing 50 mg of Fluorescent XL Particles in 5 ml of xylenes as a solvent. This provided a clear ink. The ink was printed by using an experimental inkjet printer (Dimatix). A picture of the print was able to be clearly viewed under a under black light. The text print was invisible under room light and outdoor conditions.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A fluorescent organic nanoparticle, comprising:
   a polymeric matrix comprising one or more crosslinked polyester resins, wherein the crosslinked polyester resins comprise about 50 to about 99.99 weight percent of the total weight of the nanoparticle; and
   one or more fluorescent dyes, wherein the fluorescent dyes are incorporated into the polymer matrix;
   wherein the fluorescent organic nanoparticles have a size of less than 500 nanometers (nm) and are dispersible in an organic solvent.

2. The fluorescent organic nanoparticle of claim 1, wherein the crosslinked polyester resin is a linear propoxylated bisphenol A fumarate resin.

3. The fluorescent organic nanoparticle of claim 1, wherein the one or more fluorescent dyes is an invisible fluorescent dye.

4. The fluorescent organic nanoparticle of claim 1, wherein the one or more fluorescent dyes is an organic dye, or a coordination compound of at least one lanthanide.

5. The fluorescent organic nanoparticle of claim 1, wherein the one or more fluorescent dyes comprises from about 0.01 to about 50 weight percent to total weight of the nanoparticle.

6. The fluorescent organic nanoparticle of claim 1, wherein the fluorescent nanoparticle has a size of less than about 200 nm.

7. An inkjet composition, comprising the fluorescent nanoparticles of claim 1.

8. A process for preparing a fluorescent organic nanoparticle, comprising:
   preparing a polymer latex or emulsion comprising one or more polyester resins, wherein the crosslinked polyester resins comprise about 50 to 99.99 percent of the total weight of the nanoparticle,
   incorporating one or more fluorescent dyes in the latex or emulsion, and
   crosslinking the one or more polyester resins to produce a fluorescent organic nanoparticle having a size of less than about 500 nm comprising a polymeric matrix comprising one or more crosslinked polyester resins, and comprising one or more fluorescent dyes incorporated into the polymer matrix, wherein the fluorescent organic nanoparticle is dispersible in an organic solvent.

9. The process of claim 8, wherein the crosslinking is by a thermal radical initiated crosslinking process.

10. The process of claim 8, further comprising adding a crosslinking initiator to the resin latex or emulsion to initiate crosslinking.

11. The process of claim 8, wherein the one or more fluorescent dyes comprises from about 0.01 to about 50 weight percent to total weight of the nanoparticle.

12. The process of claim 8, wherein the fluorescent organic nanoparticle has a size of less than about 200 nm.

13. The process of claim 8, wherein the crosslinked polyester resin is a linear propoxylated bisphenol A fumarate resin.

14. The process of claim 8, wherein the one or more fluorescent dyes is an invisible fluorescent dye.

* * * * *